(No Model.)

J. A. FANCHER.
CIDER PRESS.

No. 341,466. Patented May 11, 1886.

Witnesses:
C. E. Buckland
H. R. Williams

Inventor:
James A. Fancher.
by Simonds & Burdett,
attys

United States Patent Office.

JAMES A. FANCHER, OF WEST GRANBY, CONNECTICUT.

CIDER-PRESS.

SPECIFICATION forming part of Letters Patent No. 341,466, dated May 11, 1886.

Application filed March 23, 1885. Serial No. 159,720. (No model.)

*To all whom it may concern:*

Be it known that I, JAMES A. FANCHER, of West Granby, in the county of Hartford and State of Connecticut, have invented a certain new and useful Improvement in Cider-Presses, whereof the following is a description, reference being had to the accompanying drawings, where—

Figure 1:
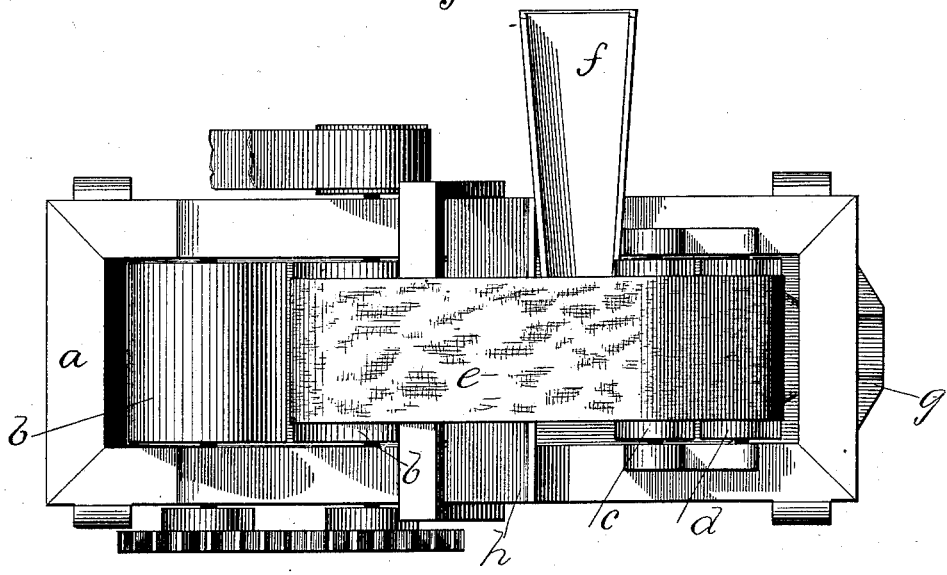
Figure 2:
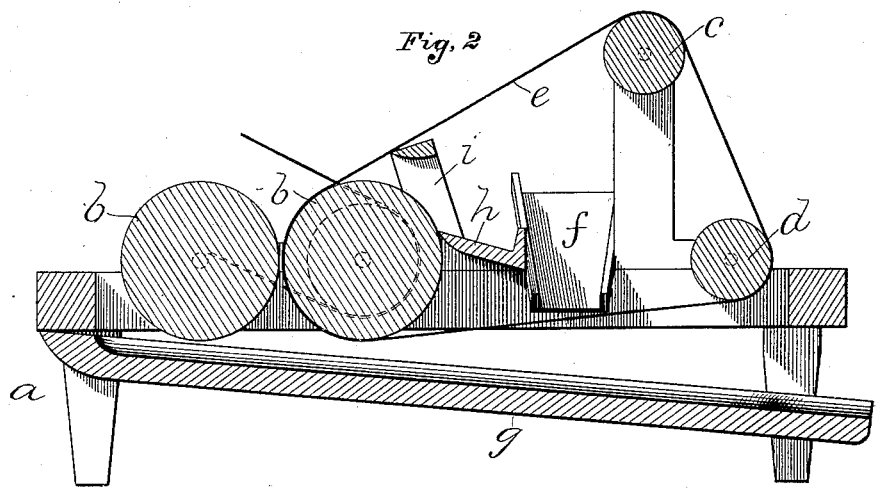

Figure 1 is a top view of a machine embodying my said improvement. Fig. 2 is a view of the same in central vertical lengthwise section.

The title hereinbefore given to this improvement indicates its purpose—to wit, a press for the expression of juice from apples and other fruit and the like.

In the accompanying drawings, the letter $a$ denotes the frame of the machine in general.

The letters $b\ b$ denote two pressing-rollers.

The letters $c$ and $d$ denote two auxiliary rollers.

The letter $e$ denotes an endless apron, which may well be made of stout webbing running around one of the pressing-rollers and around the auxiliary rollers.

The letter $f$ denotes a pomace-duct for conducting the crushed fruit upon the apron. A grater or grinder may of course be located immediately over the apron, and in such case its delivery would take the place of and be the equivalent of the duct.

In the operation of this machine the crushed fruit or pomace falls upon the endless apron, as indicated in the drawings, and is carried by the apron between the pressing-rollers, where the juice is thoroughly expressed and falls down upon the catch-board $g$, which is wider than the rolls, and recessed on its face, to catch and hold the juice, which juice descends to the lower end of the board and there escapes into some proper receptacle through a duct or trough made in the surface of the lower end of the catch-board. The pomace, after passing through the pressing-rolls and having the juice expressed, passes over the pressing-roll, which is inside the endless apron, and is removed from the surface of that roll by the scraper $h$, which is a sort of trough arranged transversely of the machine, so that the pomace may escape at the ends of this scraper. If any of the pomace sticks to the endless apron after leaving the pressing-roll, it is removed therefrom by the apron-scraper $i$, so as to again fall down upon the roll and travel down to the scraper $h$, where it will be properly removed.

It will be observed that in this machine the pomace is delivered upon the inner side or face of the endless belt, with the result that when the pomace passes between the pressing-rolls it is between one of the rolls and the belt, and as the pressure is exerted the expressed juice can and does find its way to the outer facing of the belt, thence dropping to the trough beneath, the pomace all the while being held securely in place and passed along in its travel with the revolution of the roll. It will also be observed that the catch-board, which catches the expressed juice, is practically beneath the entire operating mechanism—that is, beneath the pressing-rolls—and beneath substantially, if not the whole, of the belt, so as to catch every drop of juice which falls from any point. At the same time the whole arrangement is very simple.

I claim as my invention—

In combination, the pressing-rolls $b\ b$, the auxiliary rolls, the endless apron $e$, pomace-duct $f$, delivering on the inner side of the endless apron, and the catch-board $g$, underneath the pressing-rolls and the apron, all substantially as described, and for the purpose set forth.

JAMES A. FANCHER.

Witnesses:
CONDIT HAYES,
WILBUR RUICK.